May 2, 1939. T. H. ROBERTSHAW 2,156,606
DEVICE FOR DELIVERING A MEASURED QUANTITY OF
LIQUID FROM A BOTTLE OR LIKE CONTAINER
Filed Aug. 12, 1938
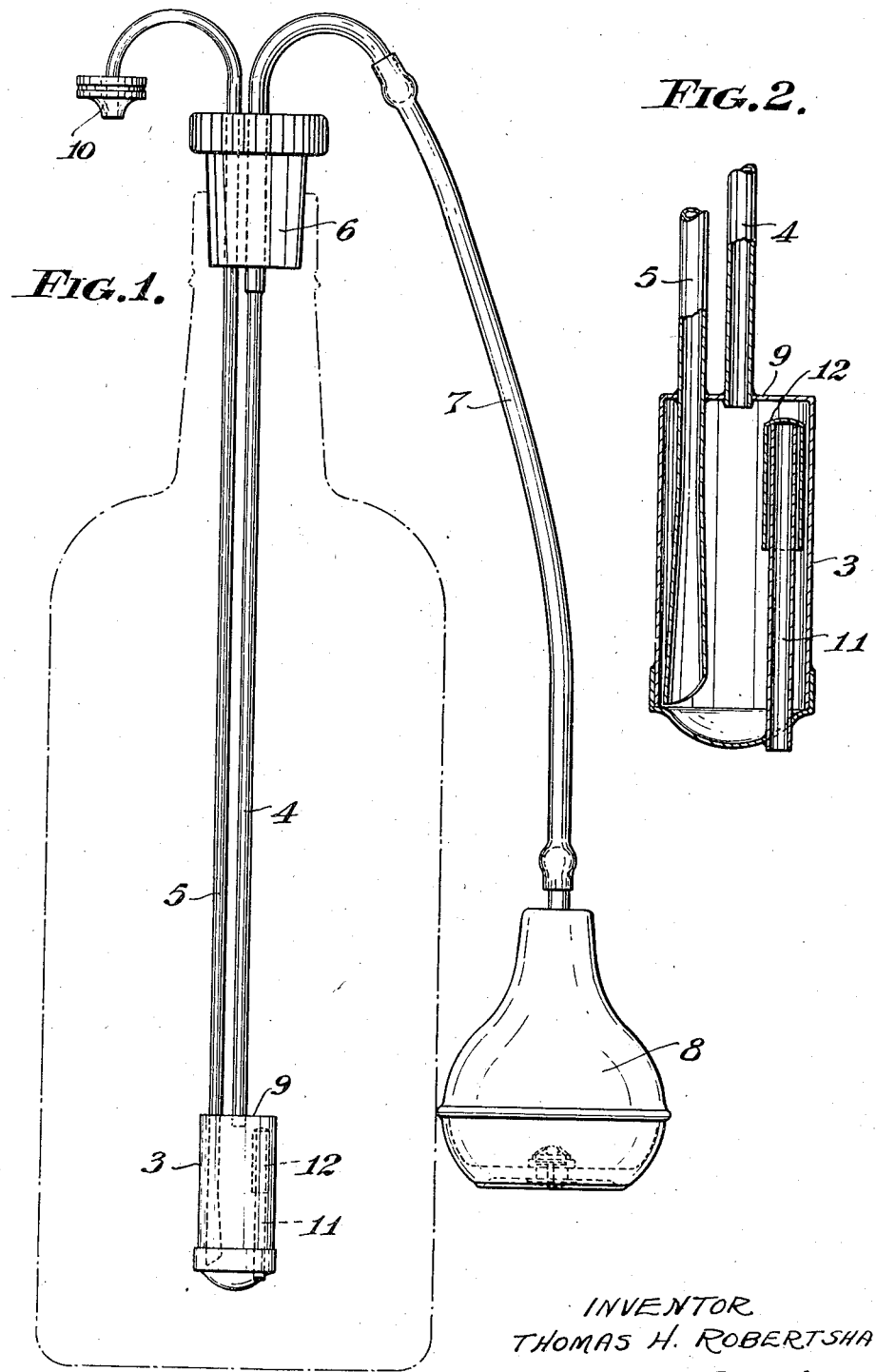
INVENTOR
THOMAS H. ROBERTSHAW Patented May 2, 1939

2,156,606

UNITED STATES PATENT OFFICE 2,156,606

DEVICE FOR DELIVERING A MEASURED QUANTITY OF LIQUID FROM A BOTTLE OR LIKE CONTAINER

Thomas Henry Robertshaw, Cardiff, Wales

Application August 12, 1938, Serial No. 224,613
In Great Britain November 26, 1937

3 Claims. (Cl. 221—147)

This invention relates to a device for delivering a measured quantity of liquid from a bottle or like container, and has for its object the provision of a device of simple form which is adapted to be fitted into or upon the neck or mouth of a bottle or container and which can be manipulated in a simple manner and without having to manoeuvre the bottle itself to deliver a predetermined quantity of liquid, the device remaining in position in the bottle or container during the delivery operation, and, in fact, until said bottle or the like is nearly empty. An object of the invention is the provision of a device having these characteristics and which is suitable for use in any case where an approximate measured quantity of liquid is to be delivered, for instance, in the making of a beverage or medicinal preparation, the device further being particularly suitable for the filling of pocket petrol lighters from a stock supply of petrol.

The invention concerns the known kind of appliance for delivering a measured quantity of liquid from a container which comprises a closed receiving vessel immersed in the body of liquid in the container, a valve-controlled liquid-admission passage for said receiving vessel, means for forcing air into the receiving vessel from the outside of the container, and a delivery tube for delivering from the container the liquid which is displaced from the receiving vessel by the injected air.

The present invention provides a device of the kind above set forth for delivering a measured quantity of liquid from a bottle or like container wherein the receiving vessel is rigidly suspended from a stopper or cap adapted to fit the neck of a bottle or like container and the liquid-admission passage of said receiving vessel is constituted by a rigid tube upstanding within said vessel and furnished at the upper end with a cap normally seating under its weight upon the extremity of said tube to form a non-return valve, said cap being designed to afford sufficient clearance between itself and the tube to permit the admission into the receiving vessel when said cap is raised.

A device of practical form embodying the invention will now be described with reference to the accompanying drawing illustrating the device according to such embodiment and wherein:

Figure 1 is an elevation of the device, the bottle to which it is applied being shown in dotted lines; and, Figure 2 is a fragmentary sectional view of the lower part of the device.

Referring to the drawing, the device comprises a hollow cylindrical receiving vessel 3 which is rigidly suspended through the medium of tubes 4, 5 from a stopper 6 provided for the bottle, the vessel 3 thus taking up a position near the bottom of the bottle so as to be immersed in the body of the liquid contained therein.

The tube 4 serves as an air-injecting tube and it passes through the stopper 6, the portion of the tube which extends thereabove being bent downwardly and being fitted at its extremity with a flexible tube 7, on the further end of which is fitted a compressible rubber bulb 8 embodying the usual air-admission non-return valve as provided in bulbs of scent-sprays and the like. The lower end of the tube 4 passes through and is rigidly affixed to the top 9 of the vessel 3, and it terminates in the locality of said top 9.

The tube 5 also passes through the stopper 6, the portion of said tube which extends thereabove being bent downwardly and fitted with a suitable form of delivery nozzle 10. The lower end of said tube 5 passes through the top 9 of the vessel 3 and is rigidly affixed thereto, and it extends down the interior of said vessel 3 and terminates near the closed bottom of said vessel. If desired, its lower extremity may be outwardly flared as shown.

Internally of the receiving vessel 3 there is provided a liquid-admission tube 11. This tube passes through the closed bottom of the vessel 3 and is rigidly secured thereto so that it upstands vertically within the said vessel, and said tube terminates at its upper end to leave a small space between itself and a portion of the closed top 9 of the vessel 3, that is to say, it is out of line with the air-admission tube 4.

Upon the upper end of the tube 11 there is loosely mounted a cap 12 having a closed top which is adapted, under the weight of said cap, to seat upon the upper end of said tube 11, thereby forming a non-return valve for interrupting communication between the tube 11 and the interior of the vessel 3, the clearance between the wall of said cap 12 and the tube 11 being sufficient to allow liquid to pass up between the cap and into the vessel 3 when the cap rises.

Assuming the vessel to be full of liquid, the effect of compressing the bulb 8 in the hand will be to force a charge of air through the tube 4 and into the upper part of the vessel 3. This air is unable to escape through tube 11 since that tube is closed by its valve cap 12 and consequently the injected air forces the liquid contained in the vessel 3 (plus the small quantity that has entered pipes 4 and 5) out of said vessel by way of the delivery tube 5 whereby it is delivered to nozzle 10. The bulb 8 is now relieved of hand pressure and it returns to its original condition by drawing back the air from vessel 3 to cause a decrease of pressure therein. Any lost air becomes replaced by way of the non-return valve of the bulb. The pressure of the body of liquid in the bottle will now cause some of the liquid to pass up the tube 11 and lift the valve cap 12 thereof, the entering liquid overflowing said tube 11 and therefore filling the vessel 3 ready for a further delivery operation. The top of the vessel 3 forms a stop to limit the lifting movement of the valve cap 12.

By reason of the drop in pressure in vessel 3 when the bulb 8 is allowed to expand, any liquid which is present in the delivery tube 5 is drawn back into said vessel and consequently there is not the slightest possibility of drips falling from the delivery nozzle 10 after having carried out the delivery operation.

I claim:

1. A device for dispensing a measured quantity of liquid from a bottle or like container, comprising a stopper for the bottle, air injecting and liquid discharge tubes, carried by said stopper, a receiving vessel suspended from the ends of said tubes, an intake tube within said vessel constituting the liquid admission passage therefor, a cap including a tubular portion and normally seating under its own weight upon the upper extremity of said intake tube to form a non-return valve, the tubular portion of said cap being of larger diameter than the intake tube to permit admission of liquid into the receiving vessel when said cap is raised, and an air pressure bulb in piped relation to said air injecting tube.

2. A device for dispensing a measured quantity of liquid from a bottle or like container as set forth in claim 1, wherein the receiving vessel has a closed top and the said intake tube for admitting liquid terminates a short distance beneath the closed top of the receiving vessel and out of line with the air-injecting tube so that said top forms a stop to limit the upward movement of the valve cap of said tube.

3. A device for dispensing a measured quantity of liquid from a container, comprising, a closure for the container, air injecting and liquid discharge tubes carried by said closure, a discharge nozzle for the discharge tube, an air pressure bulb in piped relation to said air injecting tube, a vessel for receiving the quantity of liquid to be dispensed carried by the lower ends of said air injecting and liquid discharge tubes, said vessel comprising a top wall, a side wall, and a bottom wall, said liquid discharge tube having its lower end piercing the top wall and extending in relatively close proximity to the bottom wall and said air injecting tube terminating near the inner side of said top wall, an intake tube piercing the bottom wall of the vessel and extending upwardly into the same and terminating short of the inner side of the top wall thereof, and a valve carried by the upper end of the intake tube and limited in its upward movement by the said inner side of the top wall of the vessel.

THOMAS HENRY ROBERTSHAW.